(12) United States Patent
Kim

(10) Patent No.: US 6,442,623 B1
(45) Date of Patent: Aug. 27, 2002

(54) METHOD AND ARRANGEMENT FOR RESTORING A DAMAGED ROM BIOS USING A PREVIOUSLY COMPRESSED ROM BIOS IMAGE

(75) Inventor: Kee-Taek Kim, Kyonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/216,746

(22) Filed: Dec. 21, 1998

(30) Foreign Application Priority Data

Dec. 20, 1997 (KR) .............................. 97-71386

(51) Int. Cl.⁷ .......................... G06F 13/10; G06F 9/45; G06F 11/00
(52) U.S. Cl. .................. 710/8; 710/10; 713/1; 713/2; 714/5; 714/6; 711/102
(58) Field of Search .................. 710/8, 10; 714/6, 714/5; 713/1, 2

(56) References Cited

U.S. PATENT DOCUMENTS

| | | | |
|---|---|---|---|
| 5,327,531 A | * | 7/1994 | Bealkowski et al. ........ 395/164 |
| 5,410,699 A | * | 4/1995 | Bealkowski et al. ........ 395/700 |
| 5,535,357 A | * | 7/1996 | Moran et al. ................ 395/430 |
| 5,657,473 A | * | 8/1997 | Killean et al. .............. 395/490 |
| 5,797,023 A | * | 8/1998 | Berman et al. ........ 395/750.06 |
| 5,822,582 A | * | 10/1998 | Doragh et al. .............. 395/652 |
| 5,835,761 A | * | 11/1998 | Ishii et al. .................. 395/653 |
| 5,862,147 A | * | 1/1999 | Terauchi .................... 371/21.1 |
| 5,887,163 A | * | 3/1999 | Nguyen et al. ............. 395/652 |
| 6,182,213 B1 | * | 1/2001 | Klein ............................ 713/2 |
| 6,253,281 B1 | * | 6/2001 | Hall ........................... 711/112 |

* cited by examiner

Primary Examiner—Jeffrey Gaffin
Assistant Examiner—Rehana Perveen
(74) Attorney, Agent, or Firm—Robert E. Bushnell, Esq.

(57) ABSTRACT

In a method and arrangement for restoring a ROM BIOS which is damaged due to electric impact or noise in peripheral equipment supporting an external host computer, a CPU detects and restores the damaged ROM BIOS using a ROM BIOS image already compressed and stored in a flash memory. Therefore, even if the ROM BIOS in the flash memory is damaged, a user need not download the ROM BIOS image.

19 Claims, 2 Drawing Sheets

METHOD AND ARRANGEMENT FOR RESTORING A DAMAGED ROM BIOS USING A PREVIOUSLY COMPRESSED ROM BIOS IMAGE

CLAIM OF PRIORITY

This application makes reference to, incorporates the same herein, and claims all benefits accruing under 35 U.S.C. §119 from an application for A METHOD FOR RESTORING A DAMAGED ROM BIOS earlier filed in the Korean Industrial Property Office on the 20$^{th}$ of December 1997 and there duly assigned Serial No. 71386/1997.

BACKGROUND OF THE INVENTION

1. Technical Field

The present invention relates to a method and arrangement for restoring a damaged read-only memory (ROM) basic input/output system (BIOS) and, more particularly, to a method and arrangement for restoring a ROM BIOS stored in a flash memory to control a peripheral equipment when it is damaged due to an electrical impact.

2. Related Art

With the development of a computer, peripheral equipment relating to the computer have been improved and have various functions. The peripheral equipment has a separate central processing unit (CPU) to carry out various complex functions. A program which makes the CPU perform the various complex functions is referred to as a ROM BIOS.

The ROM BIOS must be executed as soon as electric power is applied to the peripheral equipment. On the other hand, the ROM BIOS is stored in a nonvolatile memory so that it is preserved when the supply of electric power to the peripheral equipment is interrupted.

Generally, a mask ROM, an erasable/programmable read-only memory (EPROM) or the like is used as a memory for storing the ROM BIOS. However, since the ROM BIOS has more functions and larger capability than a conventional ROM BIOS, it is rarely required that some functions be added to the ROM BIOS or that "bugs" in the ROM BIOS be corrected after the memory containing the ROM BIOS is produced. For that reason, a flash memory has recently been used as a nonvolatile memory to store the ROM BIOS. Such a flash memory is capable of preserving data therein even if the supply of electric power to the peripheral equipment is interrupted, and writing and reading of the data is possible.

Since the flash memory for storing the ROM BIOS is a storage element for storing data using electric signals, the ROM BIOS stored in the flash memory can be damaged by an electric impact applied to the peripheral equipment and noise generated in the peripheral equipment. In the case just described above, the peripheral equipment controlled by the ROM BIOS stored in the flash memory operates abnormally. Accordingly, ROM BIOS image data corresponding to the damaged ROM BIOS must be downloaded from a host computer to the peripheral equipment, and must be written into the flash memory.

Furthermore, ROM BIOS image data and a program for downloading the ROM BIOS data are needed for user to restore the damaged ROM BIOS. A manufacturer of the peripheral equipment must provide the ROM BIOS data and the program for downloading the ROM BIOS data to the user. As a result, the manufacturer is subjected to a burden of providing a post-sale service.

SUMMARY OF THE INVENTION

The present invention has been developed to overcome the above described problem.

It is an object of the present invention to provide a method and arrangement for restoring a ROM BIOS in a flash memory when the ROM BIOS is damaged due to electric impact.

To accomplish the above object of the present invention, there is provided a method for restoring a damaged ROM BIOS, comprising the steps of:

calculating a checksum of a ROM BIOS in a flash memory when peripheral equipment is reset;

detecting whether the checksum is correct;

detecting whether the flash memory is initialized when the checksum is incorrect;

downloading an entire ROM BIOS image from a host computer so that the flash memory is initialized;

restoring the ROM BIOS in the flash memory without the flash memory being initialized; and resetting the peripheral equipment.

The downloading step includes the steps of:

deleting all sectors in the flash memory, except for a boot sector;

downloading the ROM BIOS data from the host computer connected to the peripheral equipment, and recording the ROM BIOS data in the flash memory; and compressing and storing the ROM BIOS data in a compressing and storing sector.

The ROM BIOS restoring step includes the steps of:

deleting all of the sectors in the flash memory, except for the compressing and storing sector and the boot sector;

releasing or decompressing the ROM BIOS data which is compressed and stored in the compressing and storing sector; and recording the released or decompressed ROM BIOS data is flash memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Hereinafter, a method and arrangement for restoring a ROM BIOS according to an embodiment of the present invention will be described in detail with reference to accompanying drawings.

Figure 1:
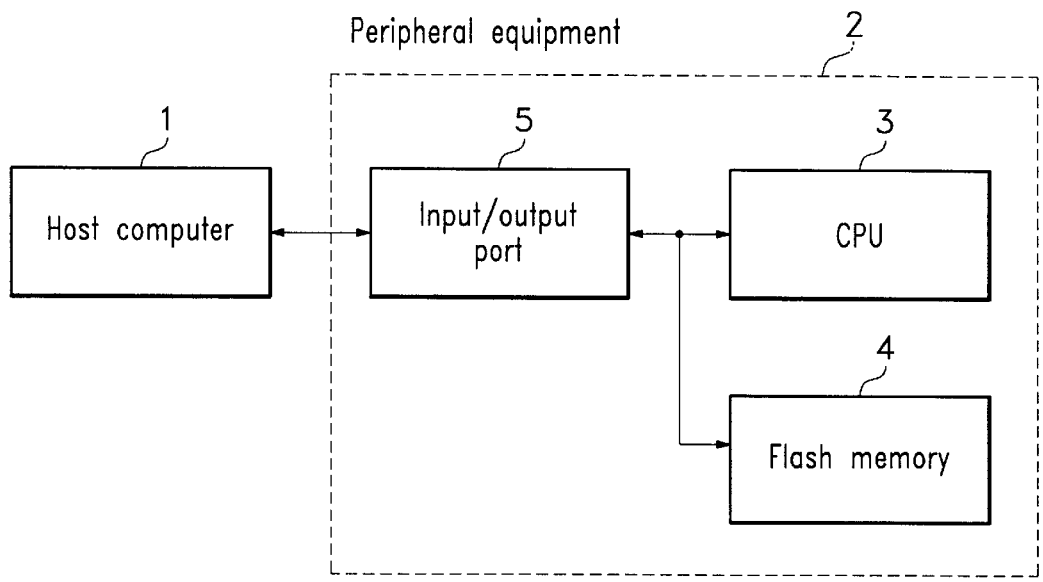
FIG. 1 is a schematic block diagram showing peripheral equipment to which a method according to the present invention is applied.

FIG. 1 is a block diagram showing peripheral equipment to which a method according to the present invention is applied. As shown in FIG. 1, peripheral equipment 2 supporting a host computer 1 includes a CPU 3 for controlling the peripheral equipment 2, a flash memory 4 for storing a ROM BIOS which is executed by the CPU 3, and an input/output port 5 for inputting data to and outputting data from the host computer 1.

The CPU 3 controls the peripheral equipment 2 while transferring and receiving data and control signals to/from the host computer 1 through the input/output port 4. When the flash memory 4 is at an initial situation or state, and the ROM BIOS is corrected, the peripheral equipment 2 receives the ROM BIOS data to be stored in the flash memory 4. In that case, the ROM BIOS data is downloaded from the host computer 1 to the peripheral equipment 2 through the input/output port 5.

Figure 2:
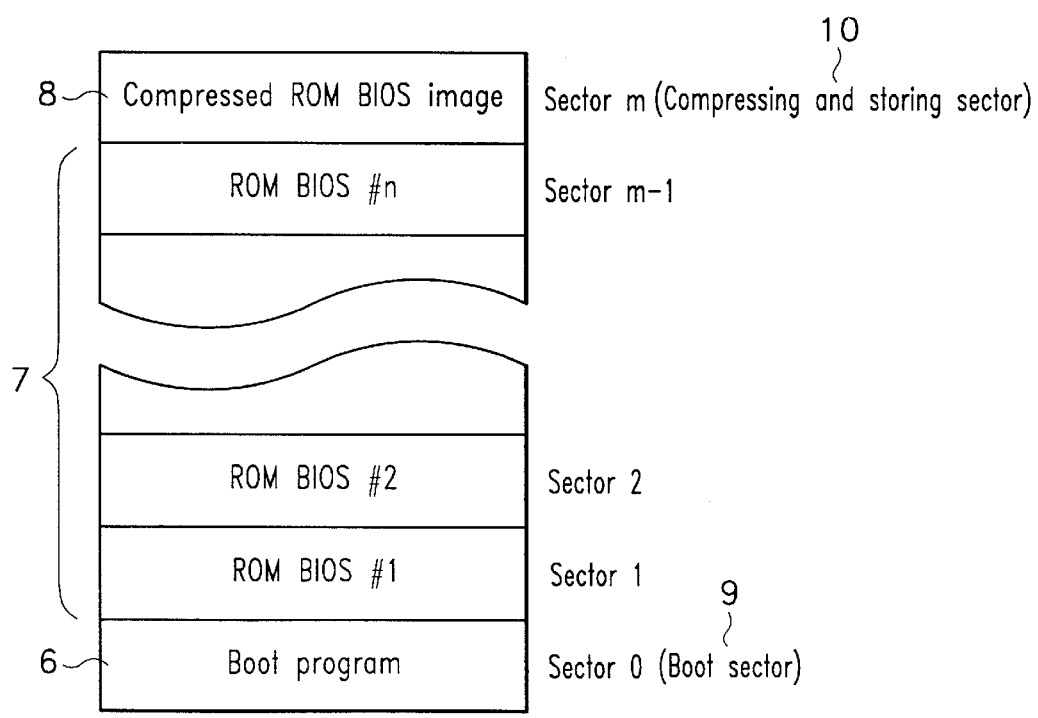
FIG. 2 is a view showing an arrangement of a ROM map in a flash memory to which the method according to the present invention is applied.

FIG. 2 is a view showing the arrangement of a ROM map in the flash memory 4 to which the method according to the present invention is applied. As shown in FIG. 2, the flash memory 4 is divided into a plurality of sectors having a predetermined size. The ROM BIOS data is stored in respective sectors. A first sector in the flash memory 4 is provided as a boot sector 9 in which a boot program 6 is stored. The boot program 6 is initially executed by the CPU 3 of peripheral equipment 2. The boot program 6 is typically stored in the boot sector 9 when the peripheral equipment 2 is manufactured. Writing data into the boot sector 9, in which the boot program 6 is stored, is prohibited by a sector closing function of the flash memory 4.

On the other hand, a suitable sector of the flash memory 4 is provided as a compressing and storing sector 10 to store compressed ROM BIOS image data 8 of the ROM BIOS 7. The general ROM BIOS image data are not downloaded to the compressing and storing sector 10. Sectors 1 thru n of the ROM BIOS image data are stored in sectors 1 thru m−1, respectively, as generally designated by reference numeral 7 in FIG. 2.

Hereinafter, a process for restoring the damaged ROM BIOS according to the present present invention will be described in detail with reference to FIG. 3.

Figure 3:
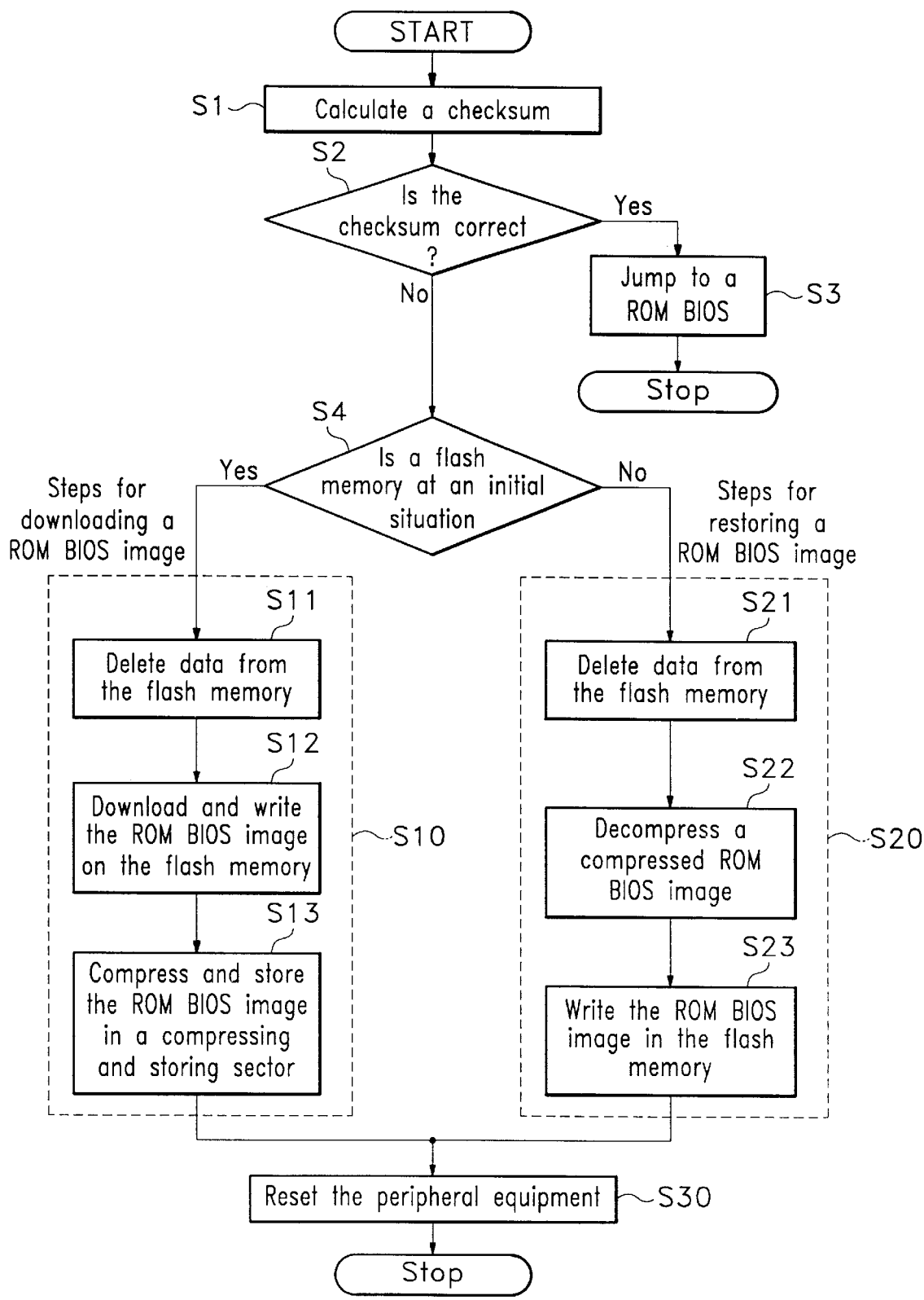
FIG. 3 is a flow chart showing a process for restoring a damaged ROM BIOS according to the present invention.

FIG. 3 is a flow chart showing the process for restoring the damaged ROM BIOS according to the present invention.

When the peripheral equipment 2 is reset by a user, at step S1, the CPU 3 calculates a checksum of the ROM BIOS 7 stored in the flash memory 4 according to the boot program 6 stored in the boot sector 9.

At step S2, it is determined whether or not the checksum of the ROM BIOS 7 is correct. If the checksum is correct, at step S3, the CPU 3 jumps to the sector in which the ROM BIOS 7 is stored to execute the ROM BIOS 7. If the checksum of the ROM BIOS 7 is incorrect, the CPU 3 determines whether or not the flash memory 4 is at an initial situation or state.

When the flash memory 4 is at its initial situation so that no ROM BIOS data are stored, it has a hexadecimal value of FF. If it is determined that the flash memory 4 is at the initial state, the CPU 3 performs a downloading of the ROM BIOS image data at step S10. If it is determined that the flash memory 4 is not at the initial state, the CPU 3 determines that the ROM BIOS stored in the flash memory 4 is damaged, and restores the ROM BIOS at step S20.

The CPU 3 deletes the ROM BIOS in all of the sectors of the flash memory 4, except for the boot sector 9, at step S11. Then, the CPU 3 stores the entire ROM BIOS image downloaded from the host computer 1 in the flash memory 4 at step S12. Finally, the CPU 3 compresses the ROM BIOS image stored in the flash memory 4, and stores the compressed ROM BIOS image in the compressing and storing sector 10 at step S13.

In step S21, the CPU 3 deletes the ROM BIOS in all of the sectors of the flash memory 4 except for the boot sector 9 and the compressing and storing sector 10. Then, the CPU 3 decompresses the compressed ROM BIOS image 7 stored in the compressing and storing sector 10 at step S22. Finally, the CPU 3 restores the damaged ROM BIOS 7 by storing the ROM BIOS image 7 in the flash memory 4 at step S23.

On the other hand, when the ROM BIOS downloading step S10 and the ROM BIOS restoring step S20 are complete, the CPU 3 resets the peripheral equipment 2 at step S30.

As described above, even if the ROM BIOS in the flash memory 4 is damaged due to electric impact or noise, the peripheral equipment 2 can detect that the ROM BIOS is damaged and restores the damaged ROM BIOS 7.

Accordingly, there is an advantage in that, even though the ROM BIOS 7 in the flash memory 4 is damaged due to electric impact or noise, the damaged ROM BIOS 7 is automatically restored according to the method of the present invention. As a result, a user need not cause the ROM BIOS 7 to be downloaded from the host computer 1 to the peripheral equipment 2.

Furthermore, there is an advantage in that, since the peripheral equipment 2 itself can restore the damaged ROM BIOS 7, the burden of post-sale service of the peripheral equipment can be eliminated or reduced.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for restoring a damaged ROM BIOS, comprising the steps of:

calculating a checksum of a ROM BIOS in a flash memory when peripheral equipment are reset;

detecting whether the checksum is correct;

detecting whether the flash memory is in, an initial state when the checksum is incorrect;

downloading an entire ROM BIOS image from a host computer when the checksum is incorrect and the flash memory is in the initial state;

restoring the ROM BIOS in the flash memory when the checksum is incorrect and the flash memory is not in the initial state; and resetting the peripheral equipment.

2. A method as claimed in claim 1, wherein the flash memory comprises sectors and the downloading step includes the steps of:

deleting all sectors in the flash memory except for a boot sector;

downloading the ROM BIOS image from the host computer and recording the downloaded ROM BIOS image into the flash memory; and compressing the downloaded ROM BIOS image to obtain a compressed ROM BIOS image, and storing the compressed ROM BIOS image in a compressing and storing sector of the flash memory.

3. A method as claimed in claim 2, wherein the compressing and storing sector includes a specified sector for storing the comprises ROM BIOS image.

4. A method as claimed in claim 2, wherein the boot sector comprises a sector of the flash memory which is initially accessed by a central processing unit to initialize the peripheral equipment to be reset.

5. A method as claimed in claim 2, wherein the step of restoring the ROM BIOS includes the steps of:

deleting all sectors in the flash memory except for the compressing and storing sector and the boot sector;

decompressing the compressed ROM BIOS image stored in the compressing and storing sector to obtain a decompressed ROM BIOS image; and recording the decompressed ROM BIOS image in the flash memory.

6. A method as claimed in claim 1, wherein the steps are carried out by a boot program stored in a boot sector of the flash memory.

7. A method as claimed in claim 1, wherein the flash memory comprises sectors and the step of restoring the ROM BIOS includes the steps of:

deleting all sectors in the flash memory except for a compressing and storing sector and a boot sector;

decompressing a compressed ROM BIOS image stored in the compressing and storing sector to obtain a decompressed ROM BIOS image; and recording the decompressed ROM BIOS image in the flash memory.

8. A method as claimed in claim 1, further comprising the step of jumping to and executing the ROM BIOS when the checksum is correct.

9. A method for restoring a damaged ROM BIOS, comprising the steps of:

providing peripheral equipment connected to a host computer and including a flash memory;

calculating a checksum of a ROM BIOS in the flash memory;

determining whether the checksum is correct;

determining whether the flash memory is in an initial state when the checksum is determined to be incorrect;

downloading a ROM BIOS image from the host computer when the checksum is correct and the flash memory is determined to be in the initial state;

restoring the ROM BIOS to the flash memory when the checksum is correct and the flash memory is determined to be not in the initial state; and resetting the peripheral equipment.

10. A method as claimed in claim 9, wherein the flash memory comprises sectors and the downloading step includes the steps of:

deleting all sectors in the flash memory except for a boot sector;

downloading the ROM BIOS image from the host computer and recording the downloaded ROM BIOS image in the flash memory; and compressing the downloaded ROM BIOS image to obtain a compressed ROM BIOS image, and storing the compressed ROM BIOS image in a compressing and storing sector of the flash memory.

11. A methods as claimed in claim 10, wherein the compressing and storing sector includes a specified sector for storing the compressed ROM BIOS image.

12. A method as claimed in claim 10, wherein the peripheral equipment includes a central processing unit, and wherein the boot sector is initially processed by the central processing unit to initialize the peripheral equipment.

13. A method as claimed in claim 10, wherein the step of restoring the ROM BIOS includes the steps of:

deleting all sectors in the flash memory except for the compressing and storing sector and the boot sector;

decompressing the compressed ROM BIOS image stored in the compressing and storing sector; and recording the decompressed ROM BIOS image in the flash memory.

14. A method as claimed in claim 9, wherein the steps are carried out by a boot program stored in a boot sector of the flash memory.

15. A method as claimed in claim 9, wherein the flash memory comprises sectors and the step of restoring the ROM BIOS includes the steps of:

deleting all sectors in the flash memory except for a compressing and storing sector and a boot sector;

decompressing a compressed ROM BIOS image stored in the compressing and storing sector to obtain a decompressed ROM BIOS image; and recording the decompressed ROM BIOS image in the flash memory.

16. A method as claimed in claim 9, further comprising the step of jumping to and executing the ROM BIOS when the checksum is correct.

17. An arrangement for restoring a damaged ROM BIOS in peripheral equipment connected to a host computer, said arrangement comprising a flash memory connected to a central processing unit, said flash memory comprising:

a boot sector which is initially accessed by the central processing unit to initialize the peripheral equipment;

a plurality of sectors for storing the ROM BIOS; and a compressing and storing sector for storing a compressed version of the ROM BIOS;

wherein said central processing unit calculates a checksum, determines whether the checksum is correct, determines whether the flash memory is in an initial state when the checksum is determined to be correct, and restores the ROM BIOS to the flash memory when the checksum is not correct and the flash memory is determined to be not in the initial state.

18. The arrangement as claimed in claim 17, wherein said central processing unit downloads ROM BIOS image data from the host computer when the checksum is not correct and the flash memory is in the initial state.

19. The arrangement as claimed in claim 17, wherein said central processing unit jumps to and executes the ROM BIOS when the checksum is determined to be correct.

* * * * *